(12) United States Patent
Kilburn et al.

(10) Patent No.: US 11,151,506 B2
(45) Date of Patent: Oct. 19, 2021

(54) METHOD AND SYSTEM FOR TRACKING AND OPTIMIZING CARGO UTILIZATION AND VOLUME MEASUREMENT AND IMAGING SENSING USING LIDARS AND VIDEO CAMERA

(71) Applicant: Flex Ltd., Singapore (SG)

(72) Inventors: Christopher Bjorn Kilburn, Menlo Park, CA (US); Armando J. Lucrecio, Fremont, CA (US)

(73) Assignee: Flex Ltd., Singapore (SG)

( * ) Notice: Subject to any disclaimer, the term of this patent is extended or adjusted under 35 U.S.C. 154(b) by 237 days.

(21) Appl. No.: 16/160,726

(22) Filed: Oct. 15, 2018

(65) Prior Publication Data

US 2019/0114577 A1    Apr. 18, 2019

Related U.S. Application Data

(60) Provisional application No. 62/573,048, filed on Oct. 16, 2017.

(51) Int. Cl.
*G06Q 10/08* (2012.01)
*G01S 17/86* (2020.01)
(Continued)

(52) U.S. Cl.
CPC ............ *G06Q 10/08* (2013.01); *G01S 17/86* (2020.01); *G06F 9/542* (2013.01); *G06Q 10/083* (2013.01); *G06Q 50/28* (2013.01)

(58) Field of Classification Search
CPC ...... G06Q 10/08; G06Q 10/083; G06Q 50/28; G01S 17/86
See application file for complete search history.

(56) References Cited

U.S. PATENT DOCUMENTS 6,437,702 B1    8/2002  Ragland et al.
6,919,803 B2 *  7/2005  Breed ................. G06Q 20/203
                                                340/426.19

(Continued)

FOREIGN PATENT DOCUMENTS

EP          3171307       5/2017
WO      WO 2016/183241    11/2016

OTHER PUBLICATIONS

Hagen Borstell, Toward Mobile Monitoring of Cargo Compartment Using 3D Sensors for Real-Time Routing Dec. 2014, ResearchGate (Year: 2014).*

(Continued)

*Primary Examiner* — Kevin H Flynn
*Assistant Examiner* — Ismail A Manejwala
(74) *Attorney, Agent, or Firm* — Sheridan Ross P.C.

(57) ABSTRACT

Embodiments provide for using a set of sensors installing within a cargo container and on a vehicle to measure, monitor, and manage the cargo and available cargo capacity within the container. According to one embodiment, a method for measuring cargo capacity and monitoring cargo within a cargo container can comprise reading, by a monitoring system of the cargo container, a plurality of spatial sensors installed within the cargo container. The plurality of spatial sensors can comprise, for example, one or more light detection and ranging (LiDAR) sensors. An interior of the cargo container can be mapped based on reading the plurality of spatial sensors and available cargo capacity within the cargo container can be determined based on the mapping of the interior of the cargo container. The determined available cargo capacity within the cargo container can be transmitted from the monitoring system to a cloud-based cargo management system.

12 Claims, 5 Drawing Sheets

(51) Int. Cl.
*G06F 9/54* (2006.01)
*G06Q 50/28* (2012.01)

(56) References Cited

U.S. PATENT DOCUMENTS

| | | |
|---|---|---|
| 2004/0140886 A1 | 7/2004 | Cleveland et al. |
| 2016/0180289 A1* | 6/2016 | Siris .......................... G01S 7/51 |
| | | 702/150 |
| 2016/0239792 A1 | 8/2016 | Burch et al. |
| 2016/0239802 A1* | 8/2016 | Burch ................ G06Q 10/0833 |
| 2016/0282466 A1 | 9/2016 | Epler |
| 2018/0096287 A1* | 4/2018 | Senger ............. G06Q 10/08355 |
| 2018/0128640 A1* | 5/2018 | Gonzalez Mendez ....................... |
| | | G08G 1/205 |

OTHER PUBLICATIONS

Extended European Search Report for European Patent Application No. 18200294.9, dated Dec. 21, 2018 7 pages.
Official Action for Canadian Patent Application No. 3020868, dated Dec. 27, 2019 6 pages.
Official Action for European Patent Application No. 18200294.9, dated Jun. 3, 2020 7 pages.
Official Action for Canadian Patent Application No. 3020868, dated Nov. 13, 2020 6 pages.

* cited by examiner

METHOD AND SYSTEM FOR TRACKING AND OPTIMIZING CARGO UTILIZATION AND VOLUME MEASUREMENT AND IMAGING SENSING USING LIDARS AND VIDEO CAMERA

CROSS REFERENCE TO RELATED APPLICATION

The present application claims the benefits of and priority, under 35 U.S.C. § 119(e), to U.S. Provisional Application No. 62/573,048 filed Oct. 16, 2017 by Kilburn et al and entitled "Method and System for Tracking and Optimizing Cargo Utilization and Volume Measurement and Imaging Sensing Using Lidars and Video Camera." of which the entire disclosure is incorporated herein by reference for all purposes.

FIELD OF THE DISCLOSURE

Embodiments of the present disclosure relate generally to methods and systems for measuring, tracking, and more efficiently utilizing available cargo capacity in one or more cargo containers and more particularly to using a set of sensors installing within a cargo container and on a vehicle to measure, monitor, and manage the cargo and available cargo capacity within the container.

BACKGROUND

Cargo containers are commonly used to ship goods worldwide. Such containers may be intermodal and can be used across different modes of transport such as ship, rail, or truck without unloading and reloading their cargo. Other cargo containers may be temporarily or permanently affixed to a vehicle or integrated into the vehicle itself. Regardless of the type of container used, Global Positioning System (GPS) and other networks are commonly used to locate and tracked the container and the goods therein. However, there has been limited use of various technologies which may provide a finer level of detail to manage cargo containers, the available capacity in individual containers or on individual vehicles or other conveyances at any given time, and also monitor the cargo therein. Hence, there is a need for improved methods and systems for measuring, tracking, and more efficiently utilizing available cargo capacity in cargo containers and monitoring the contents within the container.

BRIEF SUMMARY

Embodiments of the disclosure provide systems and methods for using a set of sensors installing within a cargo container and on a vehicle to measure, monitor, and manage the cargo and available cargo capacity within the container. More specifically, embodiments of the present disclosure can utilize a wide area wireless GPS tracker such as cellular or LoRA and a number of different sensors installed within and/or on a cargo container and/or vehicle transporting the container. The sensors can include, for example, volumetric sensors, weight sensors, and others. Volumetric sensors can comprise, for example, cameras, infrared sensors, Lidar, sonar and/or other applicable sensors which can be used to calculate how much free volume is available in the cargo container. One or more weight sensors can also be used to measure the strain on the rear axle to determine how much additional weight may be added before the vehicle is full. Additionally, or alternatively, pressure sensors on the tires of the vehicle hauling the cargo container can be used to determine the current weight of the container and thus, how much additional capacity is available. Based on these measurements and determinations, nearby additional loads that meet the available capacity can be scheduled and picked up, thereby maximizing the utilization of the vehicle. In other implementations, theft of goods from the cargo container can be detected and documented. Additionally, or alternatively, billing models may be introduced to either pick up the trailer or start charging for storage after the trailer has been unloaded by the customer.

According to one embodiment, a method for measuring cargo capacity and monitoring cargo within a cargo container can comprise reading, by a monitoring system of the cargo container, a plurality of spatial sensors installed within the cargo container. The plurality of spatial sensors can comprise, for example, one or more light detection and ranging (LiDAR) sensors. An interior of the cargo container can be mapped based on reading the plurality of spatial sensors and available cargo capacity within the cargo container can be determined based on the mapping of the interior of the cargo container. In some cases, one or more non-spatial sensors installed on or within the cargo container can also be read. The one or more non-spatial sensors can comprise, for example, a weight sensor, a light sensor, an acoustic sensor, a motion sensor, or a camera. In such cases, determining the available cargo capacity within the cargo container can be further based on reading at least one of the one or more non-spatial sensors. The determined available cargo capacity within the cargo container can be transmitted from the monitoring system to a cloud-based cargo management system.

The monitoring system can also monitor the interior of the cargo container using the plurality of spatial sensors and the one or more non-spatial sensors and determine whether a change has occurred in the interior of the cargo container. In response to determining a change has occurred in the interior of the cargo container, a further determination can be made as to whether the change in the interior of the cargo container is an expected change based on route and schedule information for the cargo container. In response to determining the change in the interior of the cargo container is an expected change based on the route and schedule information for the cargo container, the mapping of the interior of the cargo container, determining the available cargo capacity within the cargo container, and transmitting the available cargo capacity to the cloud-based cargo management system can be repeated. In response to determining the change in the interior of the cargo container is not an expected change based on the route and schedule information for the cargo container, one or more notifications of the change in the interior if the cargo container can be transmit to the cloud-based cargo management system.

According to another embodiment, a method for managing cargo capacity within a container can comprise maintaining, by a cargo management system, route and schedule information for the cargo container. Cargo information for the cargo container can be received by the cargo management system from a cargo monitoring system of the cargo container. The cargo information can be generated by the cargo monitoring system of the cargo container using a plurality of spatial sensors installed within the cargo container and one or more non-spatial sensors installed on or within the cargo container. A determination can be made as to whether the received cargo information for the cargo container indicates a cargo capacity update for the cargo container or notification information indicating an unexpected change within the cargo container. In response to determining the received cargo capacity information for the cargo container indicates a cargo capacity update for the cargo container, the route and schedule information for the cargo container can be updated by the cargo management system.

Alternatively, the notification information indicating the unexpected change in an interior of the cargo container can be received by the cargo management system from the cargo monitoring system of the cargo container. The notification information can be generated by the cargo monitoring system by monitoring the plurality of spatial sensors and the one or more non-spatial sensors. Based on the received notification information, a remedial action can be initiated. The remedial action initiated can also be based on one or more of the maintained route and schedule information for the cargo container, historical information maintained by the cargo management system, third-party information related to a current location for the cargo container.

According to another embodiment, a system can comprise a cloud-based cargo management system, a cargo container, a plurality of spatial sensors installed within the cargo container, and a cargo monitoring system installed on or within the cargo container. The cargo monitoring system can comprise a processor and a memory coupled with and readable by the processor and storing therein a set of instructions which, when executed by the processor, causes the processor to measure cargo capacity and monitor cargo within the cargo container by reading the plurality of spatial sensors, mapping an interior of the cargo container based on reading the plurality of spatial sensors, determining available cargo capacity within the cargo container based on the mapping of the interior of the cargo container, and transmitting, to the cloud-based cargo management system, the determined available cargo capacity within the cargo container.

The cloud-based cargo management system can comprise a processor and a memory coupled with and readable by the processor and storing therein a set of instructions which, when executed by the processor, causes the processor to manage cargo capacity within the cargo container by maintaining route and schedule information for the cargo container, receiving, from the cargo monitoring system, the cargo capacity information for the cargo container, determining whether the received cargo capacity information for the cargo container indicates a cargo capacity update for the cargo container, and in response to determining the received cargo capacity information for the cargo container indicates a cargo capacity update for the cargo container, updating, the route and schedule information for the cargo container.

The plurality of spatial sensors can comprise, for example, one or more light detection and ranging (LiDAR) sensors. In some cases, the instructions executed by the processor of the cargo monitoring system can further cause the cargo monitoring system to read one or more non-spatial sensors installed on or within the cargo container. The one or more non-spatial sensors can comprise, for example, a weight sensor, a light sensor, an acoustic sensor, a motion sensor, or a camera. In such cases, determining the available cargo capacity within the cargo container can be further based on reading at least one of the one or more non-spatial sensors.

The instructions executed by the processor of the cargo monitoring system can further cause the cargo monitoring system to monitor the interior of the cargo container using the plurality of spatial sensors and the one or more non-spatial sensors, determine whether a change has occurred in the interior of the cargo container, and in response to determining a change has occurred in the interior of the cargo container, further determine whether the change in the interior of the cargo container is an expected change based on route and schedule information for the cargo container. In response to determining the change in the interior of the cargo container is an expected change based on the route and schedule information for the cargo container, the instructions executed by the processor of the cargo monitoring system can further cause the cargo monitoring system to repeat the mapping of the interior of the cargo container, determining the available cargo capacity within the cargo container, and transmitting the available cargo capacity to the cloud-based cargo management system. In response to determining the change in the interior of the cargo container is not an expected change based on the route and schedule information for the cargo container, the instructions executed by the processor of the cargo monitoring system can further cause the cargo monitoring system to transmit one or more notifications of the change in the interior if the cargo container to the cloud-based cargo management system.

The instructions executed by the processor of the cloud-based cargo management system can further cause the cloud-based cargo management system to receive, from the cargo monitoring system, the notification information indicating the unexpected change in the interior of the cargo container and initiate a remedial action based on the received notification information. Initiating the remedial action ca be further based on one or more of the maintained route and schedule information for the cargo container, historical information maintained by the cargo management system, third-party information related to a current location for the cargo container.

Figure 1:
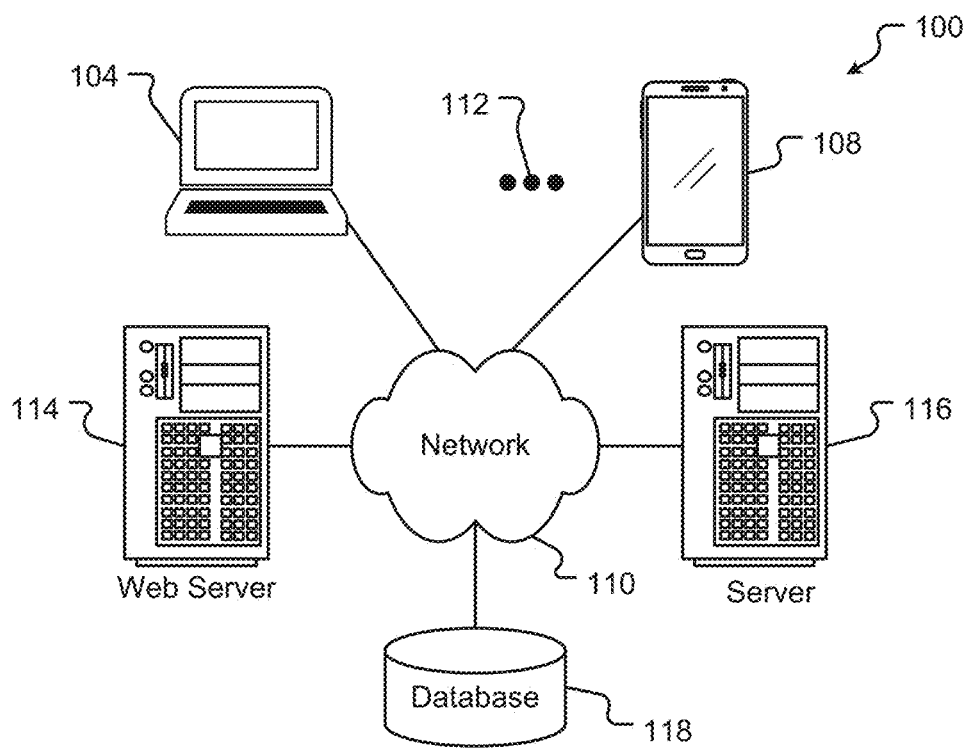
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4 G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Embodiments of the disclosure provide systems and methods for using a set of sensors installing within a cargo container and on a vehicle to measure, monitor, and manage the cargo and available cargo capacity within the container. More specifically, embodiments of the present disclosure can utilize a wide area wireless GPS tracker such as cellular or LoRA and a number of different sensors installed within and/or on a cargo container and/or vehicle transporting the container. The sensors can include, for example, volumetric sensors, weight sensors, and others. Volumetric sensors can comprise, for example, cameras, infrared sensors, LiDAR, sonar and/or other applicable sensors which can be used to calculate how much free volume is available in the cargo container. One or more weight sensors can also be used to measure the strain on the rear axle to determine how much additional weight may be added before the vehicle is full. Additionally, or alternatively, pressure sensors on the tires of the vehicle hauling the cargo container can be used to determine the current weight of the container and thus, how much additional capacity is available. Based on these measurements and determinations, nearby additional loads that meet the available capacity can be scheduled and picked up, thereby maximizing the utilization of the vehicle. In other implementations, theft of goods from the cargo container can be detected and documented. Additionally, or alternatively, billing models may be introduced to either pick up the trailer or start charging for storage after the trailer has been unloaded by the customer.

Embodiments described herein map the floor of a cargo container through a set of LiDAR sensors mounted in the cargo container and detect areas that are filled with pallets, boxes, cars, or other goods as well as areas that are open or unoccupied by cargo. An array of such sensors can be used to map the area inside the container and provide three-dimensional information (x,y,z coordinate-based location information) of the occupied and unoccupied volume detected inside the container in any light conditions and with InfraRed (IR) or other illumination. HDR cameras also mounted within or on the cargo container can be used to record video images that can be fused with volume information determined from the LiDAR sensor array to confirm how much of the container is actually being used. This concept is similar to that used in rear camera or park assistance system of a vehicle to detect other objects or cars in the vicinity while maneuvering the vehicle. Since no IR or other illumination is needed, solution becomes simpler and less expensive.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation SIP, TCP/IP, SNA, IPX, AppleTalk, and the like. Merely by way of example, the network 110 maybe a Local Area Network ("LAN"), such as an Ethernet network, a Token-Ring network and/or the like; a wide-area network; a virtual network, including without limitation a Virtual Private Network ("VPN"); the Internet; an intranet; an extranet; a Public Switched Telephone Network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including Session Initiation Protocol (SIP) servers, HTTP(s) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C #®, or C++, and/or any scripting language, such as Perl, Python, or TCL, as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network ("SAN") familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to SQL-formatted commands.

Figure 2:
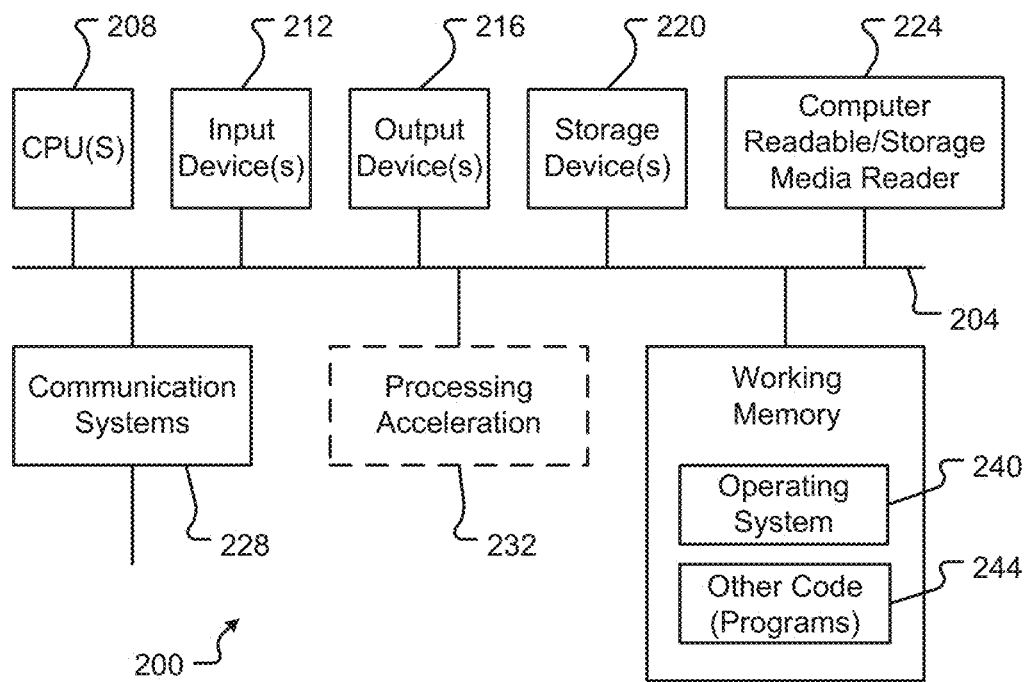
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory ("RAM") and/or a Read-Only Memory ("ROM"), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a DSP, a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including Read-Only Memory (ROM), Random-Access Memory (RAM), magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4 G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Embodiments of the disclosure provide systems and methods for using a set of sensors installing within a cargo container and on a vehicle to measure, monitor, and manage the cargo and available cargo capacity within the container. More specifically, embodiments of the present disclosure can utilize a wide area wireless GPS tracker such as cellular or LoRA and a number of different sensors installed within and/or on a cargo container and/or vehicle transporting the container. The sensors can include, for example, volumetric sensors, weight sensors, and others. Volumetric sensors can comprise, for example, cameras, infrared sensors, LiDAR, sonar and/or other applicable sensors which can be used to calculate how much free volume is available in the cargo container. One or more weight sensors can also be used to measure the strain on the rear axle to determine how much additional weight may be added before the vehicle is full. Additionally, or alternatively, pressure sensors on the tires of the vehicle hauling the cargo container can be used to determine the current weight of the container and thus, how much additional capacity is available. Based on these measurements and determinations, nearby additional loads that meet the available capacity can be scheduled and picked up, thereby maximizing the utilization of the vehicle. In other implementations, theft of goods from the cargo container can be detected and documented. Additionally, or alternatively, billing models may be introduced to either pick up the trailer or start charging for storage after the trailer has been unloaded by the customer.

Figure 3:
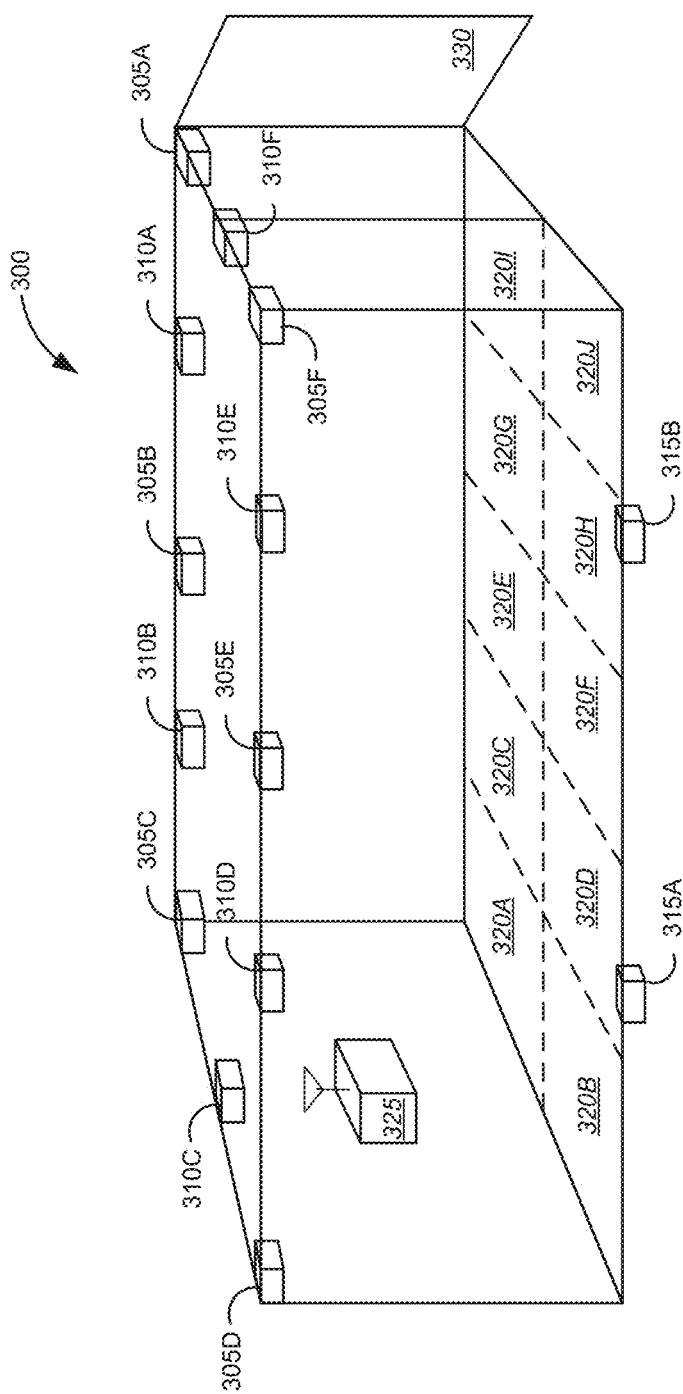
FIG. 3 is a block diagram illustrating components of an exemplary system for measuring cargo capacity and monitoring cargo within a cargo container according to one embodiment of the present disclosure.

FIG. 3 is a block diagram illustrating components of an exemplary system for measuring cargo capacity and monitoring cargo within a cargo container according to one embodiment of the present disclosure. Illustrated in this example is a cargo container 300 such as an intermodal cargo container, a rail boxcar, a trailer, a fixed cargo box on a delivery truck, van, or other vehicle, a cargo hold of an aircraft, ship, or boat, or any other container or portion of a vehicle or other conveyance capable of receiving, holding, and transporting goods, livestock and/or other cargo items.

Mounted within the cargo container 300 can be a plurality of spatial sensors 305A-305F. The spatial sensors 305A-305F can be any of a variety of sensors using lasers, sound, or other types of energy to detect the presence of objects within a space such as the interior of the cargo container 300. For example, the spatial sensors can include, but are not limited to LiDAR sensors, sonar sensors, low-power radar sensors, or similar sensors or a combination of such sensors. Regardless of the exact technology used, the spatial sensors 305A-305F can be arranged and positioned in a grid throughout the cargo container 300 to detect occupied or empty space in the container 300.

Mounted within the cargo container 300 can also be one or more non-spatial sensors 310A-310F and/or 315A-315B. Generally speaking, the non-spatial sensors 310A-310F and/or 315A-315B can be any of a variety of sensors to detect physical aspects of the cargo container 300. For example, the non-spatial sensors 310A-310F and/or 315A-315B can include, but are not limited to, one or more weight sensors, light sensors, acoustic sensors, motion sensors or detectors, cameras, and/or others or combinations of such sensors. Generally speaking, the non-spatial sensors 310A-310F and/or 315A-315B can be used to detect conditions within or around the cargo container 300 and can be used to augment the spatial sensors 305A-305F.

More specifically, the array of spatial sensors 305A-305F can be used to map the area inside the container 300 and provide three-dimensional information (x,y,z coordinate-based location information) of the occupied and unoccupied volume detected inside the container 300. This area may be divided into a grid of zones 320A-320I with each zone covered by one or more spatial sensors. Non-spatial sensors, such as one or more cameras also mounted within or on the cargo container 300, can be used to record video images that can be fused with volume information determined from the spatial sensor array 305A-305F to confirm how much of the container is actually being used. Additionally, or alternatively, non-spatial sensors such as weight sensors 315A and 315B, pressure sensors (not shown here) on tires of a vehicle on which the cargo container 300 is mounted, or other sensors can be used to measure or detect a current load in the cargo container 300 which can further augment the determination of available cargo capacity of the container 300 based on the current load relative to a maximum possible load.

A cargo monitoring system 325 can also be mounted in or on the cargo container 300. The cargo monitoring system 325 can be communicatively coupled with each of the spatial sensors 305A-305F and non-spatial sensors 310A-310F and/or 315A-315B via one or more wired or wireless communication channels including, but not limited to, Bluetooth, WiFi, or various other similar technologies suitable for wireless communications within a range covering the size of the cargo container 300. The cargo monitoring system 325 can comprise a processor and a memory coupled with and readable by the processor and storing therein a set of instructions which, when executed by the processor, causes the processor to measure cargo capacity and monitor cargo within the cargo container by reading the plurality of spatial sensors 325, mapping an interior of the cargo container 300 based on reading the plurality of spatial sensors 305A-305F, determining available cargo capacity within the cargo container 300 based on the mapping of the interior of the cargo container 300, and transmitting, to a cloud-based cargo management system (described in greater detail below), the determined available cargo capacity within the cargo container 300.

The instructions executed by the processor of the cargo monitoring system can further cause the cargo monitoring system 325 to monitor the interior of the cargo container using the plurality of spatial sensors 305A-305F and the one or more non-spatial sensors 310A-310F and/or 315A-315B, determine whether a change has occurred in the interior of the cargo container 300, and in response to determining a change has occurred in the interior of the cargo container 300, further determine whether the change in the interior of the cargo container is an expected change based on route and schedule information for the cargo container 300. For example, the cargo monitoring system 325 can be provisioned with routing and schedule information, e.g., for pick-up and/or delivery of cargo, from the cloud-based cargo management system. Additionally, the cargo monitoring system 325 can be aware to the current location of the cargo container 300 based on Global Positioning System (GPS) signals received by the cargo monitoring system 325, triangulation with cellular towers or other beacons, or other means known in the art. If the current location coincides with a pick up or deliver of cargo indicated in the routing and schedule information and the changes detected coincide with loading or unloading as also indicated in the routing and schedule information, the changes can be considered normal and expected.

In response to determining the change in the interior of the cargo container 300 is an expected change based on the route and schedule information for the cargo container 300, the instructions executed by the processor of the cargo monitoring system 325 can further cause the cargo monitoring system 325 to repeat the mapping of the interior of the cargo container 300, determining the available cargo capacity within the cargo container 300, and transmitting the available cargo capacity to the cloud-based cargo management system. For example, once the scheduled loading or unloading is finished, the determination of available cargo capacity for the cargo container 300 can be updated by the cargo monitoring system 325 and sent to the cloud-based cargo management system. As will be described below, this updated information can then be used, for example, to update scheduling and/or routing of this cargo container 300 and/or other cargo containers in a fleet or to update a historical record or tracking of the cargo container 300 relative to the routing and schedule information, i.e., to confirm proper delivery or pickup as planned.

In response to determining the change in the interior of the cargo container 300 is not an expected change based on the route and schedule information for the cargo container 300, the instructions executed by the processor of the cargo monitoring system 325 can further cause the cargo monitoring system 325 to transmit one or more notifications of the change in the interior if the cargo container to the cloud-based cargo management system. A change in the occupied space of the cargo container 300 detected by the spatial sensors 305A-305F that does not coincide with the routing and schedule information is not expected. Similarly, changes detected by the non-spatial sensors 310A-310F and/or 315A-315B may be considered to be unexpected and may be indicative of some problem. For example, a decrease in occupied volume and/or weight of the cargo container 300 at a location that does not coincide with a delivery location may indicate that cargo has fallen off or out of the container or that a theft is occurring or has occurred. Conversely, an increase in the occupied volume and/or weight of the cargo container 300 at a location that does not coincide with a scheduled delivery or pickup may indicate a person entering the cargo container to commit a theft or stow away in the container or adding to the container 300 such as attempting to smuggle unauthorized contents. Sounds detected or position sensors may be indicative of a door 330 being opened. More subtle changes, such as a change in occupied locations within the container may be indicative of a load shifting and possibly creating an unsafe condition. In any of these events, a notification can be transmitted back to the cloud-based cargo management system which, as will be described below, may initiate some corrective or remedial action. Additionally, or alternatively, the cargo monitoring system 325 may provide a warning, alert, or other message to a driver, pilot, captain, conductor, engineer, or other person responsible for operating and/or maintaining a vehicle conveying the cargo container 300.

Figure 4:
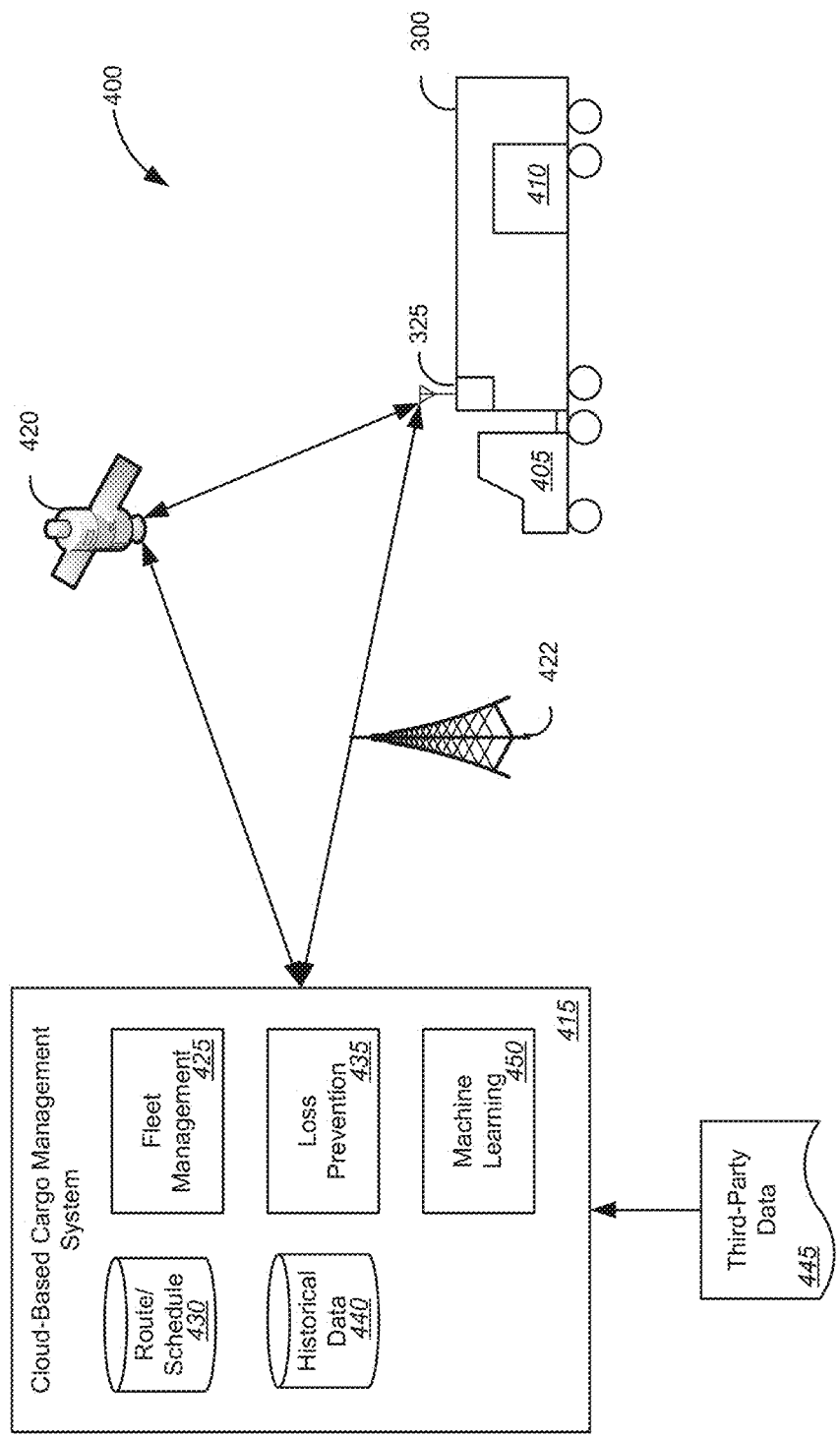
FIG. 4 is a block diagram illustrating components of a system for tracking and more efficiently utilizing available cargo capacity in one or more cargo containers according to one embodiment of the present disclosure.

FIG. 4 is a block diagram illustrating components of a system for tracking and more efficiently utilizing available cargo capacity in one or more cargo containers according to one embodiment of the present disclosure. More specifically, this example illustrates a cargo container 300 described above. The cargo container can be hauled by a vehicle 405 or other conveyance. As introduced above, the system 400 can also include a cloud-based cargo management system 415. According to one embodiment, the cargo monitoring system 325 of the cargo container 300 can be communicatively coupled with the cloud-based cargo management system 415 via one or more wireless communications links including, but not limited to, a satellite 420 communication link, one or more cellular networks 422, other wireless wide area networks, or combinations of networks.

As described above, the cargo monitoring system 325 can measure cargo capacity and monitor cargo 410 within the cargo container 300 by reading the plurality of spatial sensors 305A-305F, mapping an interior of the cargo container 300 based on reading the plurality of spatial sensors 305A-305F, determining available cargo capacity within the cargo container 300 based on the mapping of the interior of the cargo container, and transmitting, to the cloud-based cargo management system 415, the determined available cargo capacity within the cargo container 300.

The cloud-based cargo management system 415 can comprise one or more servers and/or other computers as described above. In other words, the cloud-based cargo management system 415 can comprise a processor and a memory coupled with and readable by the processor and storing therein a set of instructions which, when executed by the processor, causes the processor to manage cargo capacity within the cargo container 300. More specifically, the cloud-based cargo management system 415 can include a fleet management module 425 or similar applications which generate and maintain route and schedule information 430 for the cargo container 300. The route and schedule information 430 can include information identifying cargo 410 within the cargo container 300, deliveries and/or pickups to be made, e.g., what to pickup and/or deliver, where and when, a current location of the cargo container 300, a current load and/or available capacity of the cargo container 300, and other information. The fleet management module 425 of the cloud-based cargo management system 415 can receive, from the cargo monitoring system 325, the cargo capacity information for the cargo container 300 as described above. As described, the received information can comprise an update, such as when a pickup or delivery is made, or other notification. Accordingly, the fleet management module 425 can determine whether the received cargo capacity information for the cargo container 300 indicates a cargo capacity update for the cargo container 300. In response to determining the received cargo capacity information for the cargo container 300 indicates a cargo capacity update, the fleet management module 425 can update the route and schedule information for the cargo container 300 and/or one or more other cargo containers. That is, as pickups and deliveries are made, the available capacity of the cargo container, and possibly others, can be reconsidered and adjusted to more efficiently and effectively utilize the capacity of the container and/or fleet. Part of this consideration, in addition to the current available capacity of the container 300, may be a current location of the cargo container 300, new orders for pickups and/or deliveries, etc.

As described above, the cargo monitoring system 325 can also monitor the interior of the cargo container 300 using the plurality of spatial sensors 305A-305F and the one or more non-spatial sensors 310A-310F and/or 315A-315B to determine whether a change has occurred in the interior of the cargo container and, in response to determining a change has occurred in the interior of the cargo container, further determine whether the change in the interior of the cargo container is an expected change. Whether a change is expected or not can be based on the route and schedule information 430 for the cargo container 300 and a current location of the cargo container 300 as well as other information. The route and schedule information 430 can be downloaded or otherwise provided to the cargo monitoring system 325 by the cloud-based cargo management system 415 and the cargo monitoring system 325 can then make these determinations locally. Alternatively, the cargo monitoring system 325 may query the cloud-based cargo management system 415 for the route schedule information 430 or a confirmation based on the route schedule information 430.

In either case, and in response to determining the change in the interior of the cargo container 300 is an expected change based on the route and schedule information 430, current location, and other information for the cargo container 300, e.g., a scheduled delivery is being made at a planned location, the cargo monitoring system 325 can repeat the mapping of the interior of the cargo container 300, determining the available cargo capacity within the cargo container 300, and transmitting the available cargo capacity 300 to the cloud-based cargo management system. As noted above, the fleet management module 425 can then use this update to update the stored route and schedule information 430 and make any appropriate adjustments.

When the cargo monitoring system 300 determines based on the route and schedule information for the cargo container that the change in the interior of the cargo container 300 is not an expected change, the cargo monitoring system 325 can transmit one or more notifications of the change to the cloud-based cargo management system 415. For example, and as noted above, a detected decrease in occupied volume and/or weight of the cargo container 300 at a location that does not coincide with a delivery location may indicate that cargo has fallen off or out of the container or that a theft is occurring or has occurred. Conversely, a detected increase in the occupied volume and/or weight of the cargo container 300 at a location that does not coincide with a scheduled delivery or pickup may indicate a person entering the cargo container to commit a theft or stow away in the container or adding to the container 300 such as attempting to smuggle unauthorized contents. Other detected changes may indicate a door of the cargo container being opened or may be indicative of a load shifting and possibly creating an unsafe condition. Thus, the type of change detected can be indicated by the notification information sent by the cargo monitoring system 325.

The cloud-based cargo management system 415 can receive the notification information indicating the unexpected change in the interior of the cargo container 300 from the cargo monitoring system 325 and can initiate a remedial action based on the received notification information. According to one embodiment, a loss prevention module 435 of the cloud-based cargo management system 415 can initiate the remedial action based on one or more of the maintained route and schedule information 430 for the cargo container, historical information 440 maintained by the cargo management system, third-party information 445 related to a current location for the cargo container 300, and/or other information. For example, a remedial action may be more critical if the route and schedule information indicates that the current cargo 410 of the cargo container 300 is a hazardous material, very high value goods, or controlled substance or regulated product. The loss prevention module 435 may further decide a remedial action based on historical data 440 related to a current location of the cargo container 300. Such information may indicate that the location is a high-crime area where previous shipments have been stolen or containers have been otherwise breeched or damaged. Similarly, third party information 445 can be received from local law enforcement agencies, insurance companies, traffic reporting systems, etc. which can be used by the loss prevention module 435 in combination with the received notification information to determine what is occurring in or near the cargo container 300 and determine an appropriate response. The remedial action taken can include, but is not limited to, informing local law enforcement, informing a driver or operator of the cargo container or vehicle 405, starting one or more video, audio, and/or other surveillance sensors inside and/or on the cargo container, etc.

Figure 5:
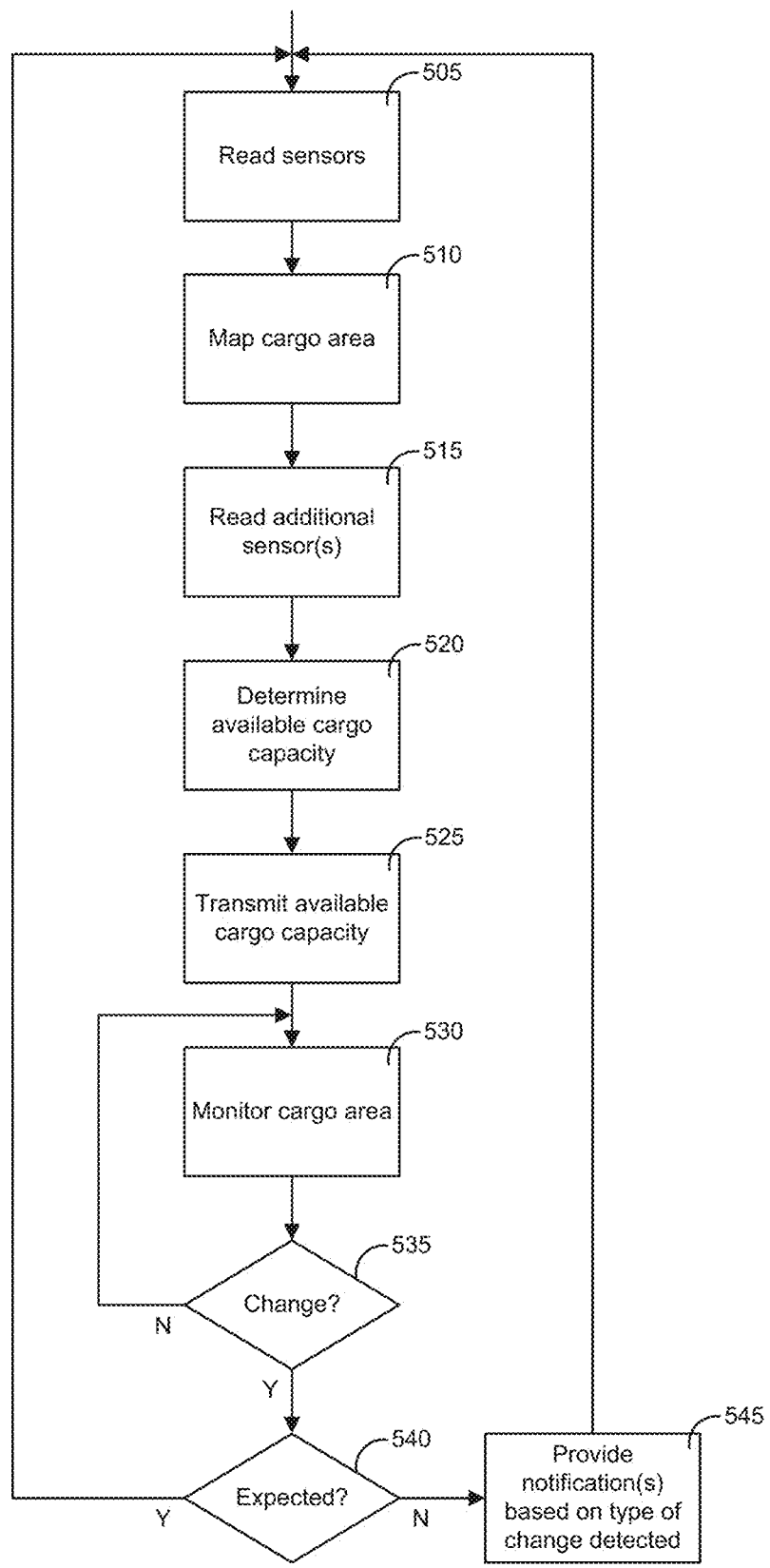
FIG. 5 is a flowchart illustrating an exemplary process for measuring cargo capacity and monitoring cargo within a cargo container according to one embodiment of the present disclosure.

FIG. 5 is a flowchart illustrating an exemplary process for measuring cargo capacity and monitoring cargo within a cargo container according to one embodiment of the present disclosure. As illustrated in this example, measuring cargo capacity and monitoring cargo within a cargo container 300 can comprise reading 505, by a monitoring system 325 of the cargo container 300 as described above, a plurality of spatial sensors 305A-305F installed within the cargo container 300. As noted, the plurality of spatial sensors 305A-305F can comprise, for example, one or more LiDAR sensors. An interior of the cargo container 300 can be mapped 510 based on reading the plurality of spatial sensors 305A-305F and available cargo capacity within the cargo container 300 can be determined 520 based on the mapping of the interior of the cargo container 300. In some cases, one or more non-spatial sensors 310A-310F and/or 315A-315B installed on or within the cargo container 300 can also be read 515. The one or more non-spatial sensors 310A-310F and/or 315A-315B can comprise, for example, a weight sensor, a light sensor, an acoustic sensor, a motion sensor, or a camera. In such cases, determining 520 the available cargo capacity within the cargo container 300 can be further based on reading 515 at least one of the one or more non-spatial sensors 310A-310F and/or 315A-315B. The determined 520 available cargo capacity within the cargo container 300 can be transmitted 525 from the monitoring system 325 to a cloud-based cargo management system 415.

The monitoring system 325 can also monitor 530 the interior of the cargo container 300 using the plurality of spatial sensors 30A-305F and the one or more non-spatial sensors 310A-310F or 315A-315B and determine 535 whether a change has occurred in the interior of the cargo container 300. In response to determining 535 a change has occurred in the interior of the cargo container 300, a further determination 540 can be made as to whether the change in the interior of the cargo container 300 is an expected change based on route and schedule information 430 for the cargo container 300. In response to determining 540 the change in the interior of the cargo container 300 is an expected change based on the route and schedule information 430 for the cargo container 300, the mapping 310 of the interior of the cargo container 300, determining 520 the available cargo capacity within the cargo container 300, and transmitting 525 the available cargo capacity to the cloud-based cargo management system 415 can be repeated. In response to determining 540 the change in the interior of the cargo container 300 is not an expected change based on the route and schedule information 430 for the cargo container 300, one or more notifications of the change in the interior if the cargo container 300 can be transmit 545 to the cloud-based cargo management system 415.

Figure 6:
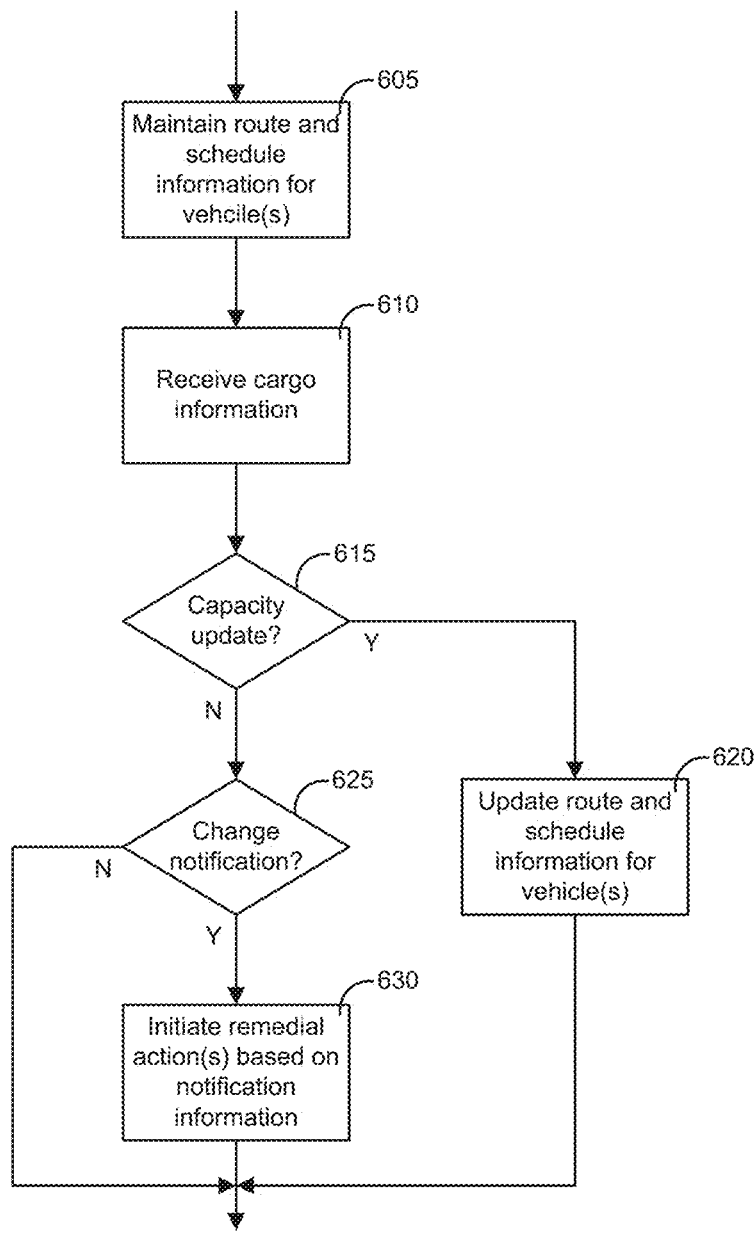
FIG. 6 is a flowchart illustrating an exemplary process for tracking and more efficiently utilizing available cargo capacity in one or more cargo containers according to one embodiment of the present disclosure.

FIG. 6 is a flowchart illustrating an exemplary process for tracking and more efficiently utilizing available cargo capacity in one or more cargo containers according to one embodiment of the present disclosure. As illustrated in this example, managing cargo capacity within a container 300 can comprise maintaining 605, by a cargo management system 415, route and schedule information 430 for the cargo container 300. Cargo information for the cargo container 300 can be received 610 by the cargo management system 415 from a cargo monitoring system 325 of the cargo container 300. The cargo information can be generated by the cargo monitoring system 325 of the cargo container 300 using a plurality of spatial sensors 305A-305F installed within the cargo container 300 and one or more non-spatial sensors 310A-310F and/or 315A-315B installed on or within the cargo container 300. A determination 615 can be made as to whether the received cargo information for the cargo container 300 indicates a cargo capacity update for the cargo container or notification information indicating an unexpected change within the cargo container 300. In response to determining 615 the received cargo capacity information for the cargo container 300 indicates a cargo capacity update for the cargo container 300, the route and schedule information 430 for the cargo container 300 can be updated 620 by the cargo management system 415.

Alternatively, the notification information indicating the unexpected change in an interior of the cargo container 300 can be received by the cargo management system 415 from the cargo monitoring system 325 of the cargo container 300. The notification information can be generated by the cargo monitoring system 325 by monitoring the plurality of spatial sensors 305A-305F and the one or more non-spatial sensors 310A-310F and/or 315A-315B. In response to determining 625 the received 610 information comprises notification information, a remedial action can be initiated 630 based on the received notification information. The remedial action initiated 630 can also be based on one or more of the maintained route and schedule information 430 for the cargo container, historical information 440 maintained by the cargo management system, and/or third-party information 445 related to a current location for the cargo container.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and \ or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for measuring cargo capacity and monitoring cargo within a cargo container, the method comprising:
reading, by a monitoring system of the cargo container, a plurality of light detection and ranging (LiDAR) sensors installed within the cargo container;
generating, by the monitoring system, a three-dimensional map of an interior of the cargo container based on reading the plurality of LiDAR sensors;
reading, by the monitoring system, one or more non-spatial sensors installed on or within the cargo container;
determining, by the monitoring system, available cargo capacity within the cargo container based on the three-dimensional map of the interior of the cargo container and further based on reading at least one of the one or more non-spatial sensors;
transmitting, from the monitoring system to a cloud-based cargo management system, the determined available cargo capacity within the cargo container;
monitoring, by the monitoring system, the interior of the cargo container using the generated three-dimensional map of the interior of the cargo container, the plurality of LiDAR sensors, and the one or more non-spatial sensors;
determining, by the monitoring system and based on the monitoring of the interior of the cargo container, that a change has occurred in the interior of the cargo container;
in response to determining that a change has occurred in the interior of the cargo container, further determining, by the monitoring system, whether the change in the interior of the cargo container is an expected change based on a maintained record storing route and schedule information for the cargo container; and
in response to determining that the change in the interior of the cargo container is an expected change based on the route and schedule information for the cargo container, repeating the generating of the three-dimensional map of the interior of the cargo container, determining the available cargo capacity within the cargo container, and transmitting the available cargo capacity to the cloud-based cargo management system.

2. The method of claim 1, wherein the one or more non-spatial sensors comprise a weight sensor, a light sensor, an acoustic sensor, a motion sensor, or a camera.

3. The method of claim 1, further comprising, in response to determining the change in the interior of the cargo container is not an expected change based on the route and schedule information for the cargo container, transmitting one or more notifications of the change in the interior of the cargo container to the cloud-based cargo management system.

4. A system comprising:
a cloud-based cargo management system;
a cargo container;
a plurality of light detection and ranging (LiDAR) sensors installed within the cargo container;
one or more non-spatial sensors installed on or within the cargo container; and
a cargo monitoring system installed on or within the cargo container and comprising a processor and a memory coupled with and readable by the processor and storing therein a set of instructions which, when executed by the processor, causes the processor to measure cargo capacity and monitor cargo within the cargo container by:
reading the plurality of LiDAR sensors,
generating a three-dimensional map of an interior of the cargo container based on reading the plurality of LiDAR sensors,
determining available cargo capacity within the cargo container based on the three-dimensional map of the interior of the cargo container and further based on reading the one or more non-spatial sensors,
transmitting, to the cloud-based cargo management system, the determined available cargo capacity within the cargo container,
monitoring the interior of the cargo container using the generated three-dimensional map of the interior of the cargo container, the plurality of LiDAR sensors, and the one or more non-spatial sensors;
determining, based on the monitoring of the interior of the cargo container, that a change has occurred in the interior of the cargo container;
in response to determining that a change has occurred in the interior of the cargo container, further determining whether the change in the interior of the cargo container is an expected change based on a maintained record storing route and schedule information for the cargo container; and
in response to determining that the change in the interior of the cargo container is an expected change based on the route and schedule information for the cargo container, repeat the generating of the three-dimensional map of the interior of the cargo container, determining the available cargo capacity within the cargo container, and transmitting the available cargo capacity to the cloud-based cargo management system.

5. The system of claim 4, wherein the cloud-based cargo management system comprises a processor and a memory coupled with and readable by the processor and storing therein a set of instructions which, when executed by the processor, causes the processor to manage cargo capacity within the cargo container by:
maintaining route and schedule information for the cargo container;
receiving, from the cargo monitoring system, cargo capacity information for the cargo container;
determining whether the received cargo capacity information for the cargo container indicates a cargo capacity update for the cargo container; and
in response to determining the received cargo capacity information for the cargo container indicates a cargo capacity update for the cargo container, updating, the route and schedule information for the cargo container.

6. The system of claim 4, wherein the one or more non-spatial sensors comprise a weight sensor, a light sensor, an acoustic sensor, a motion sensor, or a camera.

7. The system of claim 4, wherein the instructions executed by the processor of the cargo monitoring system further cause the cargo monitoring system to, in response to determining the change in the interior of the cargo container is not an expected change based on the route and schedule information for the cargo container, transmit one or more notifications of the change in the interior of the cargo container to the cloud-based cargo management system.

8. The system of claim 7, wherein the cloud-based cargo management system further causes the cloud-based cargo management system to receive, from the cargo monitoring system, notification information indicating an unexpected change in the interior of the cargo container and initiate a remedial action based on the received notification information.

9. The system of claim 8, wherein initiating the remedial action is further based on one or more of the maintained record storing route and schedule information for the cargo container, historical information maintained by the cloud-based cargo management system, or third-party information related to a current location for the cargo container.

10. A non-transitory, computer-readable medium comprising a set of instructions stored therein which, when executed by a processor, causes the processor to measure cargo capacity within a cargo container by:
   reading, by a monitoring system of the cargo container, a plurality of light detection and ranging (LiDAR) sensors installed within the cargo container;
   generating, by the monitoring system, a three-dimensional map of an interior of the cargo container based on reading the plurality of LiDAR sensors;
   reading, by the monitoring system, one or more non-spatial sensors installed on or within the cargo container;
   determining, by the monitoring system, available cargo capacity within the cargo container based on the three-dimensional map of the interior of the cargo container and further based on reading at least one of the one or more non-spatial sensors;
   transmitting, from the monitoring system to a cloud-based cargo management system, the determined available cargo capacity within the cargo container;
   monitoring, by the monitoring system, the interior of the cargo container using the generated three-dimensional map of the interior of the cargo container, the plurality of LiDAR sensors, and the one or more non-spatial sensors;
   determining, by the monitoring system and based on the monitoring of the interior of the cargo container, that a change has occurred in the interior of the cargo container;
   in response to determining that a change has occurred in the interior of the cargo container, further determining, by the monitoring system, whether the change in the interior of the cargo container is an expected change based on a maintained record storing route and schedule information for the cargo container; and
   in response to determining that the change in the interior of the cargo container is an expected change based on the route and schedule information for the cargo container, repeating the generating of the three-dimensional map of the interior of the cargo container, determining the available cargo capacity within the cargo container, and transmitting the available cargo capacity to the cloud-based cargo management system.

11. The non-transitory, computer-readable medium of claim 10, wherein the one or more non-spatial sensors comprise a weight sensor, a light sensor, an acoustic sensor, a motion sensor, or a camera.

12. The non-transitory, computer-readable medium of claim 10, further comprising, in response to determining the change in the interior of the cargo container is not an expected change based on the route and schedule information for the cargo container, transmitting one or more notifications of the change in the interior of the cargo container to the cloud-based cargo management system.

* * * * *